B. F. CADENHEAD.
Cotton-Seed Planter.

No. 160,389.  Patented March 2, 1875.

WITNESSES:  INVENTOR:
  B. F. Cadenhead
  BY
  ATTORNEYS.

THE GRAPHIC CO. PHOTO-LITH. 39 & 41 PARK PLACE, N.Y.

UNITED STATES PATENT OFFICE.

BENJAMIN F. CADENHEAD, OF BOLINGBROKE, GEORGIA.

IMPROVEMENT IN COTTON-SEED PLANTERS.

Specification forming part of Letters Patent No. 160,389, dated March 2, 1875; application filed November 4, 1874.

*To all whom it may concern:*

Be it known that I, BENJAMIN F. CADENHEAD, of Bolingbroke, in the county of Monroe and State of Georgia, have invented a new and Improved Cotton-Seed Planter; and I do hereby declare that the following is a full, clear, and exact description of the same, reference being had to the accompanying drawing, forming a part of this specification, in which—

Figure 1:
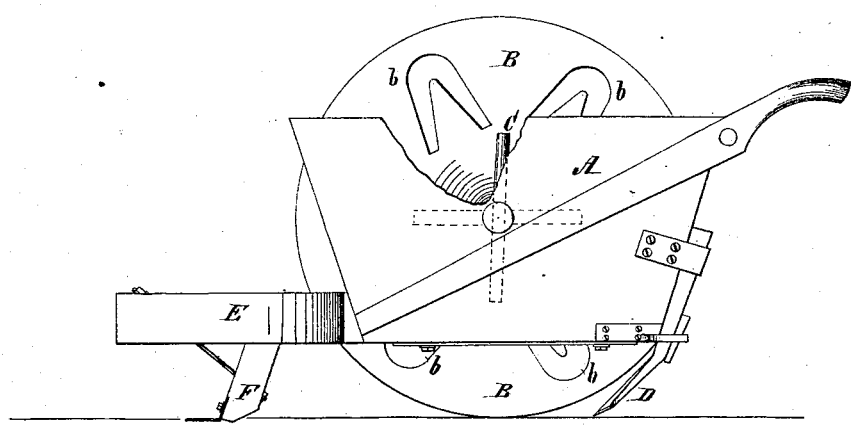
Figure 2:
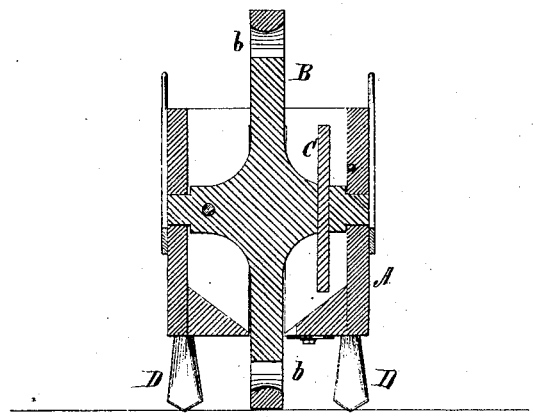

Figure 1 is a side elevation, and Fig. 2 a transverse section.

The invention relates to the construction of cotton-planters, so that they may be simple, efficient, and at the same time of comparatively little cost.

The invention will first be fully described in connection with all that is necessary to a full understanding thereof, and then pointed out in the claims.

A represents a box having a slotted bottom, front, and back, each sloping inwardly, and receiving a disk-wheel, B, journaled in the parallel sides. This wheel has feed-recesses $b$ at regular intervals between its periphery and hub, and is provided with radial stirrers C on each of its bosses. Near the rear corners of the box, by straps and wedge, or any other suitable fastening, are attached the covering-plows D D, while in the bottom extension E, that forms the draft-beam, is secured the opening-plow F.

The disk-wheel B is turned by friction as it rolls in the shallow furrow made by the furrowing-plow F, and drops the cotton-seed on each side from the feed-recesses $b$. The covering-plows D D then throw a light covering of fine dirt over the seed, and the operation of planting is completed.

This planter can be made, with the exception of plows, entirely of wood, and at a very small expense, while it is perfectly efficient in the performance of its work.

Having thus described my invention, what I claim as new is—

1. A seeder provided with a single seed-wheel, B, recessed as shown, journaled and revolving in the seed-box and on the ground, thus both supporting the whole and distributing the seed in the manner described.

2. A seed-wheel for cotton-planters, having the feed-recesses arranged at regular intervals between the periphery and hub, as shown and described.

3. A recessed seed-wheel, journaled in the seed-box, and provided with a stirrer on each of its side bosses, as shown and described.

4. The combination, with a front furrowing-plow, of a wheel, B, recessed as shown, and which distributes the seed laterally in the furrow made, and on opposite sides of said furrow, as shown and described.

BENJAMIN F. CADENHEAD.

Witnesses:
J. W. EVANS,
J. H. EVANS.